United States Patent
Dobosz et al.

(10) Patent No.: US 8,757,632 B2
(45) Date of Patent: Jun. 24, 2014

(54) SLIDING RING

(76) Inventors: Roman Dobosz, Bielsko-Biala (PL); Miroslaw Duzniak, Kozy (PL); Stefan Kuder, Janowice (PL); Jaroslaw Lasek, Bielsko-Biala (PL); Jan Wawak, Bielsko (PL)

( * ) Notice: Subject to any disclaimer, the term of this patent is extended or adjusted under 35 U.S.C. 154(b) by 865 days.

(21) Appl. No.: 12/514,573

(22) PCT Filed: Nov. 8, 2007

(86) PCT No.: PCT/PL2007/000074
§ 371 (c)(1),
(2), (4) Date: Dec. 2, 2009

(87) PCT Pub. No.: WO2008/060170
PCT Pub. Date: May 22, 2008

(65) Prior Publication Data
US 2010/0140878 A1   Jun. 10, 2010

(30) Foreign Application Priority Data

Nov. 12, 2006 (PL) ......................................... 381037

(51) Int. Cl.
*F16J 15/34* (2006.01)
(52) U.S. Cl.
USPC .......................................... 277/399; 277/400
(58) Field of Classification Search
USPC ................................................ 277/399–400
See application file for complete search history.

(56) References Cited

U.S. PATENT DOCUMENTS

| | | | | |
|---|---|---|---|---|
| 2,496,471 A * | 2/1950 | Hornbostel | .................... | 277/368 |
| 4,103,907 A * | 8/1978 | Inouye et al. | ................. | 277/400 |
| 4,489,951 A * | 12/1984 | Kataoka et al. | ............... | 277/362 |
| 5,492,341 A * | 2/1996 | Pecht et al. | .................... | 277/400 |
| 5,556,111 A * | 9/1996 | Sedy | .............................. | 277/400 |
| 5,702,110 A * | 12/1997 | Sedy | .............................. | 277/400 |
| 5,934,683 A * | 8/1999 | Sieghartner | ................... | 277/400 |
| 6,575,470 B1 * | 6/2003 | Gacek et al. | .................. | 277/399 |
| 6,726,213 B2 * | 4/2004 | Wang | ............................. | 277/400 |
| 7,377,518 B2 * | 5/2008 | Lai | ................................ | 277/400 |

* cited by examiner

Primary Examiner — Vishal Patel
Assistant Examiner — Nicholas L Foster
(74) Attorney, Agent, or Firm — Marguerite Del Valle

(57) ABSTRACT

The object of the invention is a sliding ring used in mechanical non-contact face seals. A sliding ring according to the invention is provided with grooves (1) on its faying face (5) which extend to the outer or to the inner peripheral surface, so that the faying face (s) has a recessed surface ($F_v$) and a non-recessed surface (F), whose relation $F_v/F$ is included in the range from 0.25 to 0.50 and the grooves (1) situated on the recessed surface ($F_v$) are of the shape of a bell of an inclination angle ($\alpha$) from 5° to 15° and an inclination angle ($\beta$) from 5° to 45°, while the relation of the base width (B) of the groove (1) to the top width (A) of the groove (1) is from 2 to 6, wherein all the grooves (1) are connected at their base (B) by a thin, ring-shaped groove (m) whose width against the height ($I_o$) of the groove (1) falls into the range between 0.08 and 0.25.

3 Claims, 1 Drawing Sheet

SLIDING RING

The object of the invention is a sliding ring used in mechanical non-contact face seals.

There is a mechanical non-contact face seal, known from German Patent Description No. 3722303, which has a sliding ring having spiral grooves on its end face. The grooves are of cross-section decreasing from their beginning up to the internal ending so that at the internal end of each groove both cross section and groove depth equal zero. The bottom of those grooves runs along a flat surface whose one side edge coincides with side working plane of the sliding ring.

According to the Polish Patent Description No. 187630, there is a known mechanical sealing of non-contact face type, provided with grooves that have a hollow at their end outlet in relation to the side plane of sliding rings, up to approx. 7 μm, and the surface of groove bottom in longitudinal section runs along a curve of a maximal rise up to approx. 4 μm, while in the groove cross-section, the bottom surface also runs along a curve of a rise up to approx. 4 μm, but in that cross section both side edges of the bottom are distant from the side plane of sliding rings by depths; wherein one of those depths has a size more distant from the side plane of the sliding rings than the other depth and the bigger of them equals up to 7 μm. The geometry of sliding ring grooves in their cross and longitudinal sections is, in its structure, related to the shape: known, apparently unidirectional spiral grooves, double crossed spiral grooves, single X-crossed spiral grooves, spiral grooves in the form of A open arms directed at the central part of sliding rings as well as it is structurally related to grooves which in their view onto the side plane of sliding rings, are of the shape of surfaces limited by Ω (the omega).

Additionally, there is also a sliding ring, known from the European Patent Description No. EP 1 054 196, provided with spiral grooves of a cross section that maintain the same width both at the beginning and the end of the spiral.

The sliding ring according to the invention is provided with grooves at its perimeter and it is characterised by the fact that its faying face has a recessed surface and a non-recessed surface whose relation is included in the range between 0.25 and 0.50; wherein grooves placed on the recessed surface are of the shape of a bell of α inclination angle that is from 5 to 15° and β inclination angle that is from 5 to 45° and the relation of groove base width to groove top width from 2 to 6, while all the grooves are connected on the faying face perimeter with a thin band whose width against the groove's height is included in the range from 0.08 to 0.25. The non-recessed surface of the faying face is of a width from 1.5 to 5 mm and the grooves are of a depth from 6 to 18 μm.

The said sliding ring is characterised by an even distribution of pressure and a capability of two-way operation.

The object of the invention is presented in an exemplary embodiment in the drawing sheets where FIG. 1 is the front view of the external sliding ring;

Figure 1:
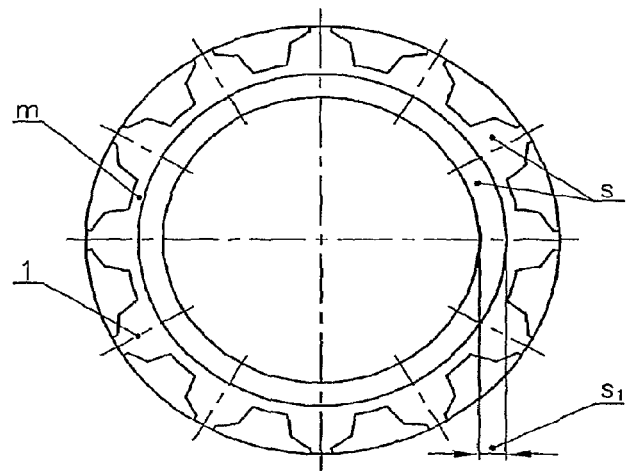
Figure 2:
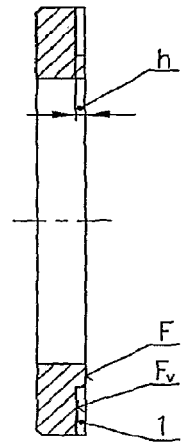
FIG. 2 is an axial section of the external sliding ring.
Figure 3:
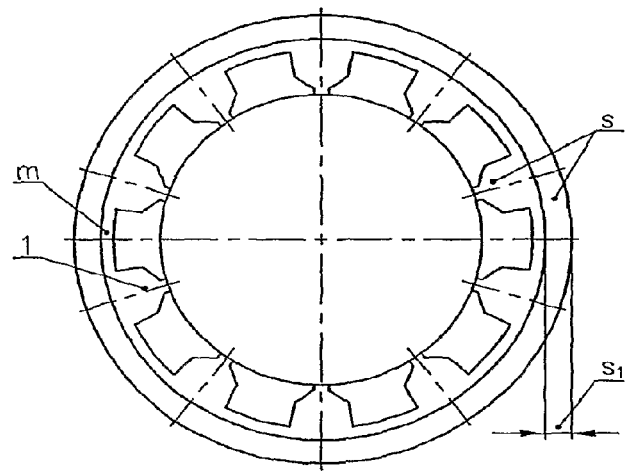
FIG. 3 is the front view of the internal sliding ring.
Figure 4:
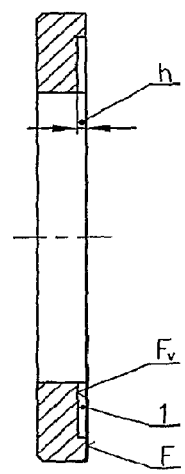
FIG. 4 is an axial section of the internal sliding ring.
Figure 5:
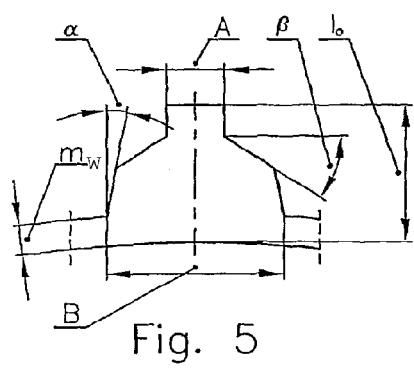
FIG. 5 shows one of the ring's grooves.

As it is presented in the drawing, the sliding ring can be produced as an external sliding ring or an internal sliding ring and it can be provided with circumferential grooves (1). The faying face (s) of the ring has a recessed surface ($F_v$) and a non-recessed surface (F), where their relation [$F_v/F$] is included in the range between 0.25 and 0.50. The grooves (1) situated on the recessed surface ($F_v$) are of the shape of a bell of an inclination angle (α) from 5° to 15° and an inclination angle (β) from 5° to 45°, while the relation of the base width (B) of the groove (1) to the top width (A) of the groove (1) is from 2 to 6. All the grooves (1) are connected on the perimeter of the faying face (s) by a thin band (m), whose width $m_w$ against the height ($I_o$) of the groove (1) falls into the range between 0.08 and 0.25. The non-recessed surface (F) of the faying face (s) is of a width ($s_1$) of a value from 1.5 to 5 mm, while the grooves (1) are of a depth (h) of a value from 6 to 18 μm.

The invention claimed is:

1. A sliding ring comprising:
   a faying face having a recessed surface and a non-recessed surface, wherein the sliding ring has a first axial thickness at a location on the recessed surface and the sliding ring has a second axial thickness at a location on the non-recessed surface and the ratio of the first axial thickness to the second axial thickness is in a range from 0.25 to 0.50;
   a plurality of symmetrical bell-shaped grooves each having two lower walls, two upper walls, a height, a top width, and a base width, situated radially on the recessed surface wherein the bell-shape has a first inclination angle from 5° to 15° formed between each of the lower walls and radial lines extending from a lowermost endpoint of each lower wall, a second inclination angle from 5° to 45° formed between each of the upper walls and lines extending from an uppermost endpoint of the upper wall, said lines being parallel to the top width, and wherein the ratio of the base width to the top width is from 2 to 6;
   a portion of the non-recessed surface in the shape of a circumferential band;
   a thin circumferential groove located on a perimeter between the bases of the bell-shaped grooves and abutting the circumferential band, and having a height, wherein the ratio of the height of the thin circumferential groove to the height of the bell-shaped grooves falls within a range of 0.08 and 0.25.

2. A sliding ring as claimed in claim 1 wherein the circumferential band is of a width of 1.5 to 5 mm.

3. A sliding ring as claimed in claim 1 wherein the bell-shaped grooves have a depth between 6 to 18 μm.

* * * * *